United States Patent [19]

Hurni

[11] E Re. 29,437

[45] Reissued Oct. 11, 1977

[54] DEVICE FOR THE VERTICAL AND LATERAL DISPLACEMENT OF RAILWAY TRACK

[75] Inventor: Hans Hurni, Pres Lausanne, Switzerland

[73] Assignee: Canron, Inc., Phillipsburg, N.J.

[21] Appl. No.: 719,507

[22] Filed: Sept. 1, 1976

Related U.S. Patent Documents

Reissue of:

[64] Patent No.: 3,832,952
Issued: Sept. 3, 1974
Appl. No.: 308,945
Filed: Nov. 24, 1972

[30] Foreign Application Priority Data

Dec. 3, 1971 Switzerland ..... 17606/71

[51] Int. Cl.[2] ..... E01B 33/02
[52] U.S. Cl. ..... 104/7 B
[58] Field of Search ..... 104/7, 7 B, 8, 12

[56] References Cited

U.S. PATENT DOCUMENTS

| | | | |
|---|---|---|---|
| 3,338,174 | 8/1967 | Oville | 104/8 |
| 3,472,173 | 10/1969 | Plasser et al. | 104/8 |

*Primary Examiner*—Richard A. Bertsch
*Attorney, Agent, or Firm*—Wenderoth, Lind & Ponack

[57] ABSTRACT

Apparatus for the vertical and lateral movement of a section of railway track. Gripping members are operated to grip the two lines of rails. The gripping members are mounted on at least one support frame connected by articulated connecting members to the chassis of a track maintenance vehicle movable on the track. The support frame is movable both vertically and laterally relative to the vehicle under the action of lifting members or lining members, to move said track section and to bring it into a predetermined reference position. The apparatus comprises in combination vertical and lateral support members connected to the support frame to guide the same and supported on at least one line of rails and guidance and control members for moving each gripping member relative to the support frame in directing both vertical and transverse to the track.

11 Claims, 8 Drawing Figures

DEVICE FOR THE VERTICAL AND LATERAL DISPLACEMENT OF RAILWAY TRACK

Matter enclosed in heavy brackets [ ] appears in the original patent but forms no part of this reissue specification; matter printed in italics indicates the additions made by reissue.

BACKGROUND OF THE INVENTION i. Field of Invention

The present invention relates to a device for the vertical and lateral displacement of a section of railway track. Stated more narrowly the present invention relates to a device for displacing rails laterally and vertically in which gripping members to grip the two lines of rails and mounted on at least one support frame connected by articulated connecting members to the chassis of a track maintenance vehicle which moves along the track. The support frame is both vertically and laterally displaceable relative to the vehicle by the action of lifting or lining means to displace the track section and bring it into a predetermined reference position.

ii. Prior Art

Devices of the above type are already known but they cannot be used in all the construction variants encountered along railway tracks, particularly in zones where the track is crossed by apparatus such as switching or crossing points, movable switch rails, crossing cheeks or guide rails.

These devices are in fact the product of an assembly of known means first for lifting the track and secondly for lining the track. However the assembly has not been designed to resolve the problems posed by the combined lifting and lining of sections of track equipped with apparatus as described above. Hitherto for such sections use has been made of independent lifting or lining devices, each being suitable to a greater or lesser extent for the difficulties encountered as shown hereinafter.

Thus for lifting, a first solution comprises equipping the track maintenance vehicles with supplementary hooks used to grip the underside of the rail or even sometimes the sleepers themselves when it was not possible to use the gripping devices for the heads of the rails, e.g. when passing fish plates or switching points. A second solution consisted of increasing the number of gripping members spaced along the rails. These gripping members are generally rollers which roll on either side of the head of the rails in such a way that for example, on passing a fish plate at least one set of rollers can be in action beyond the fish plate whilst the other rollers are removed to pass the fish plate. However, such devices cannot be used to pass crossings and points or on the track close to crossings and points. In these places the free space necessary for their action on the sides of the rails to be gripped does not exist. In fact all the known lifting devices using gripping devices to grip either the rail head or the underneath of the tie plate of rails and they can only perform this gripping action by rotating the gripping member in a plane transverse and vertical to the track and inside and/or outside the track. This means that any obstacle in the immediate proximity to the rails to be gripped prevents their use. As this is the case when two rails join or come close together as well as adjacent points or a crossing there are always areas of the track which cannot be lifted mechanically by the known track equipment.

For lining purposes devices are known which use rollers supported on the upper face of the rail head. The rollers are provided with flanges applicable to either one or both sides of the rail head. However, quite independent of the fact that they do not permit the lifting of the track, it is vital to apply to them a vertical downwardly directed pressure onto the rail to [unable] *enable* them to line the track laterally without the possibility of derailing the roller. This is clearly contrary to the effects sought in using the device namely the combined lifting and lining of a railway track. Devices are also known, such as pins or vertical journals, which can be applied to one flank of a rail head and devices combining the two above-mentioned devices. These devices can be effectively used for lining the track but cannot be used for lifting the track as they were not designed for this purpose.

The assemblage into a single device of the known devices does not solve the problems posed by the combined leveling and lining of sections of tracks equipped with apparatus as exemplified above. In fact as has been shown above either these devices cannot be used everywhere or the actions of constituent parts are incompatible.

SUMMARY OF THE INVENTION

The present invention provides a single device that includes members for lifting and lining a section of track in such a way that both the vertical and lateral displacement of the track can be carried out in all the construction variants encountered along railway tracks, in particular when passing fish plate and track equipment such as points, crossings, etc.

The device according to the invention includes gripping members that grip the two lines of rails. These gripping members are mounted on at least one support frame connected by articulated connecting members to the chassis of a track maintenance vehicle movable along the track. The support frame is displaceable both vertically and laterally relative to the vehicle under the action of lifting or lining members to displace said track section and bring it into a predetermined reference position. The device of the invention comprises, in combination, *rail engaging means in the form of* lateral and vertical support members connected to the support frame of the gripping members for guiding said support frame and resting on at least one line of rails, and guidance and control members to displace each gripping member relative to the support frame in directions vertical and transverse to the track.

The [advantage] *advantages* of this combination are shown in detail by the description and drawing which follow, but it can be easily understood that as a result of the spatial mobility provided to the gripping member, which can be of any appropriate shape for engagement underneath any lateral outline of the line of rails or the track equipment to be gripped, it is always possible to perform a gripping operation at any level relative to the upper surface of the rail head as well as at any lateral distance relative to the side of said rail head and then to move the track both vertically and laterally by the combined action of the gripping member and the support member by the controlled displacements of the support frame.

The relative movements of a gripping member relative to a support frame can be obtained in any appropriate manner notably by the use of an intermediate chassis upon which the gripping member is height-adjustably mounted. The intermediate chassis is itself displaceably mounted on the support frame in a plane parallel to the track plane and transversely thereto.

In the same way the regulation of the vertical displacement of a gripping member relative to its intermediate chassis can be obtained by a device having multiple clamping abutments randomly interchangeable by means of a pre-selection control member. The space between the abutments is selected to adapt to the different levels of the contours to be gripped, as will be shown hereinafter.

In an advantageous and preferred form of the device according to the invention the support frame extends at least over the complete width of the railway track and supports directly or indirectly the gripping and support members of the two lines of rails of the track. This arrangement offers a number of advantages including ease of distribution of the track displacement loads on the two lines of rails.

To increase the possibilities of adaptation to track obstacles further the articulated connecting members connecting the support frame to the chassis of the vehicle comprise control members for moving the support frame in a direction longitudinal to the track and/or rotating the frame in a plane substantially parallel to the plane of the track. It is then advantageous to couple to the support frame a guide which accompanies it in its movements and prevents it turning on itself about its longitudinal axis.

In the preferred embodiment of the invention the vertical and lateral support members of the support frame can be mounted on at least one axle parallel to the support frame. The axle is movable along its axis by at least one control member which is e.g. extensible. The axle is connected to the support frame so as to be supported as desired against the side of the rail head of one or other of the lines of rails. It is then advantageous to provide the axle movement control means with a force which is at least equal to half that of the lining members which displace said support frame in order to obtain the same lateral displacement force on the two lines of rails.

Finally, it is also possible to adapt the apparatus according to the invention in its above-indicated preferred form to the different heights of the rail heads of conventional rails by mounting the axle of the height-adjustable support members on and relative to the support frame.

The invention is described by way of example, with reference to the accompanying drawings in which.

DESCRIPTION OF PREFERRED EMBODIMENTS

Figures 1, 2, 3, 4, 5:
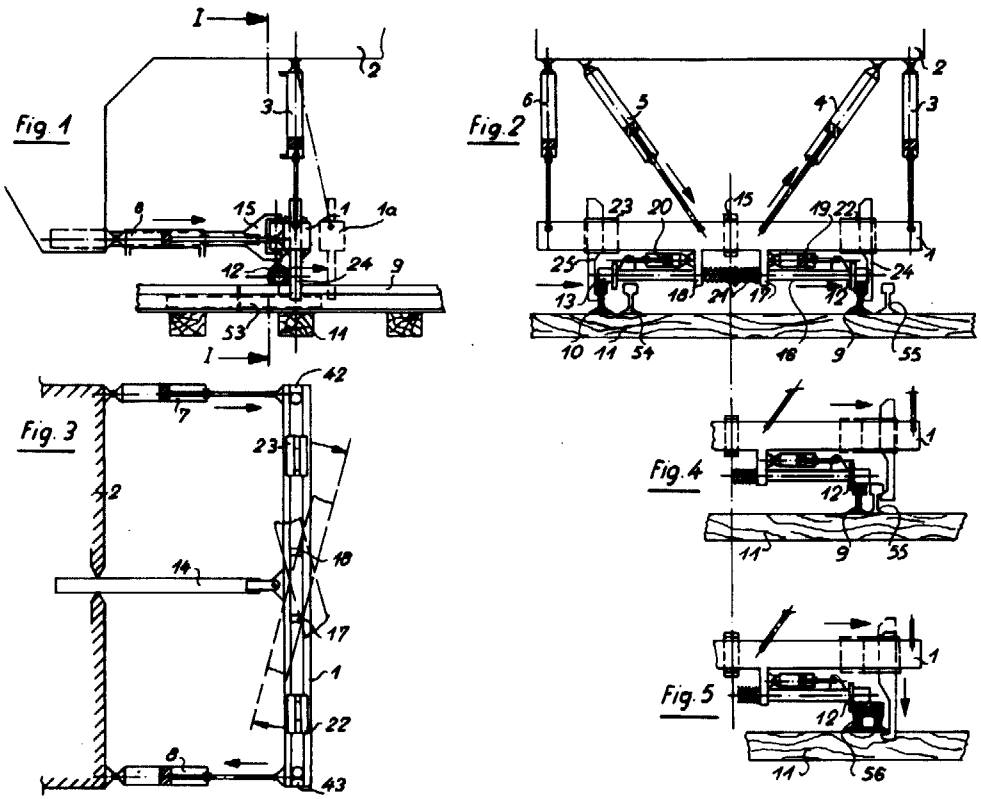
FIGS. 1, 2 and 3 are respectively a front view, a left-hand sectional view on the line I—I of FIG. 1 and plan view of the device.
FIGS. 4 and 5 are partial views of the right-hand side of FIG. 2 showing the control of the position of the gripping member.

FIGS. 1, 2 and 3 show a support frame 1 articulated to a chassis 2 of a track working vehicle according to the invention. Articulation is via extensible articulated, double acting hydraulic jacks 3, 4, 5, 6 and 7, 8. Support frame 1 rests on two lines of rails 9 and 10 of a railway track, (one sleeper 11 of which is shown) via *rail engaging means such as* intermediate guidance members 12 and 13 to which reference will be made below. A guide 14 sliding in the vehicle chassis articulated by a fork 15 in the centre of the support frame accompanies the latter in all its movements whilst preventing it from turning on itself about its longitudinal axis. The articulation points of the cylinder barrels and the piston rods of the jacks connecting the support frame to the vehicle chassis are swivelled so as to permit, within adequate limits, complete liberty of movement for said support frame. When the apparatus is nonoperative the frame is simply guided on the rails by the guidance members 12 and 13. When the apparatus is working the jacks act as desired to lift and line the track. When working its movements can be broken down as follows:

The vertical movements of the support frame are controlled by the parallel jacks 3 and 6 (FIG. 2).

The lateral movements of the support frame are controlled by the differential action of jacks 4 and 5 (FIG. 2)[,].

The substantially horizontal movements of the support frame in the longitudinal direction of the railway track are controlled by the action of jacks 7 and 8 (FIG. 3).

The rotation of the support frame in a plane substantially parallel to that of the track about the articulation of the fork 15 of the guide 14 is controlled by the action of the jacks 7 and 8 (FIG. 3). Thus by the combined action of jacks 3, 4, 5 and 6 together with that of jacks 7 and 8, it is possible to obtain any desired combinations of the movements of the support frame.

Two intermediate chassis 22 and 23 slide transversely to the track on the support frame 1. Chassis 22 and 23 carry, respectively, the gripping members 24 and 25 (FIG. 3) height-adjustably mounted relative to the chassis. This effect is shown in detail in FIGS. 7 and 8. These two figures show one of the gripping members 25 whose lower portion in the form of a hook 26 can be introduced beneath the rail head 10 in order both to raise it and push it laterally whilst being supported on its web. This gripping member 25 slides vertically between the symmetrical guidance flanges 27 and 28 of the intermediate chassis 23 which for this purpose has vertical grooves that engage pins 29 and 30 integral with the gripping member 25. The movement of the gripping member 25 is controlled by the action of a double acting hydraulic jack 31 connecting gripper member end 32 remote from the hook 26 to the lower end 33 to the guidance flanges 27 and 28. The connections of these two flanges that space them have not been shown for reasons of clarity. The movement of the jack 31 is controlled within predetermined limits by the stops 34, 35, 36 and 37 which are supported on a key 38. The position of the key 38 is regulatable by means of the control of a double acting hydraulic jack 39 to which it is connected. This permits selection of one or other of said stops. The spaces between the first stop 34 and each of the stops 35, 36 and 37 are selected to correspond to the normal spaces encountered in the height of rails for a purpose which will be indicated below. The two flanges 27 and 28 of the chassis slide respectively on two longitudinal girders 40 and 41 of the support frame 1. These two girders are connected by end struts 42 and 43 and bearings 17 and 18 (FIG. 3). The movements of the intermediate chassis are controlled by a double acting hydraulic jack 44 supported at one end on a pin 45 integral with the support frame and at the other end on a pin 46 integral with the two flanges of said chassis.

As shown in FIG. 2 on the support frame 1 are also mounted the guidance members 12 and 13. These are rollers mounted at the ends of an axle 16 sliding and turning in bearings 17 and 18 fixed to the support frame 1. These rollers have a flange so that they can be laterally pressed against the inner face of the rail head by the combined action of two double acting hydraulic jacks 19 and 20 connecting respectively the axle 16 to the bearings 17 and 18. Two springs 21 each supported on a central shoulder of axle 16 and one of the bearings 17 and 18 serve to centre the axle 16 when the jacks 19 and 20 are released. The set of arrows shows that when it is, for example, desired to move the track to the right the support frame 1 is pushed to the right relative to the chassis 1 of the vehicle by the differential action of the jacks 4 and 5. The support frame, in this movement, entrains the two gripping members 24 and 25 only one of which (25 in FIG. 2) is supported on the rail (rail 10 in FIG. 2). On the other side, the rail 9 receives the lateral displacement to the right via the flange of roller 12 through the jacks 19 and 20. The displacement *force on rail 9* is selected to be [at least] equal to half that obtained on the support frame 1 by jacks 4 and 5.

Figures 6, 7, 8:
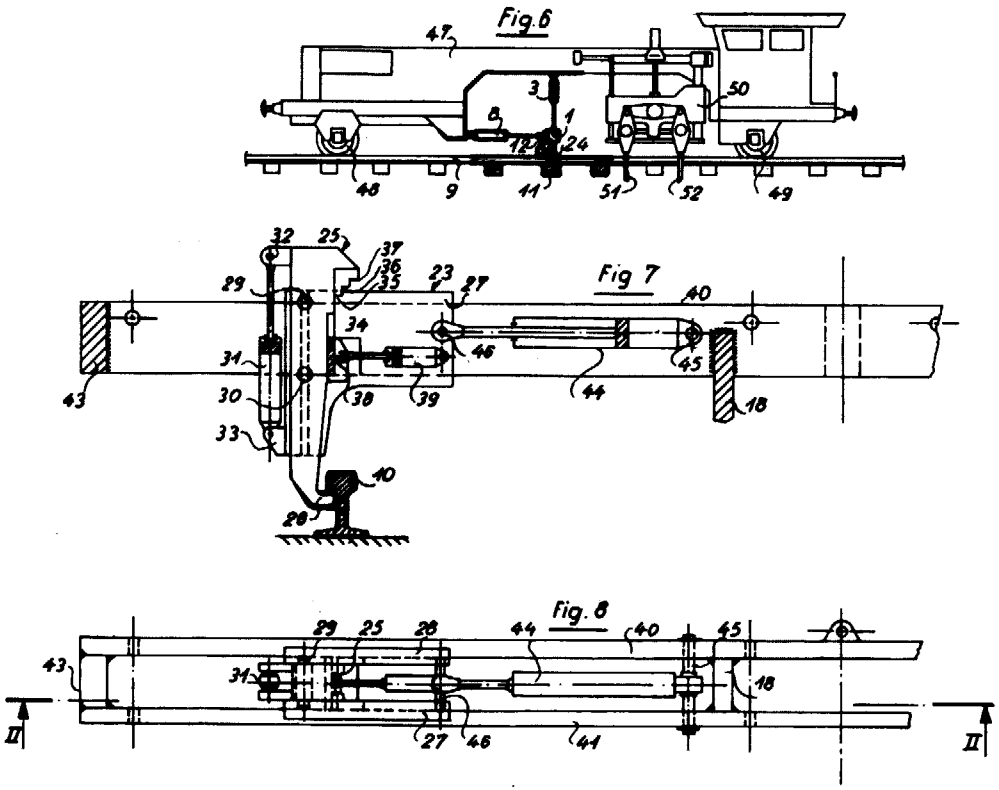
FIG. 6 shows a tamping, leveling and lining track working vehicle equipped with the device according to the invention.
FIG. 7 is a detailed elevation of the operation of a gripping member according to section II—II of FIG. 8.
FIG. 8 is a plan view of FIG. 7.

FIG. 6 shows schematically a track working vehicle of the tamping, leveling, lining type equipped with a device according to the invention. This vehicle whose chassis 47 rests on the track via two axles 48 and 49 is equipped with tamping units 50 having vibrating tools 51 and 52 to tamp the ballast under the sleepers. The tamping units are in accordance with those described in Swiss Pats. 507,415 and 511,979, particularly adapted to tamping points, crossing and other track equipment. It is particularly advantageous to install a lifting lining device according to the invention, the reference numerals being the same as in FIG. 1, on such a type of vehicle because of the possibilities of adapting said device to the obstacles encountered during leveling and lining railway equipment.

FIGS. 1, 2, 4 and 5 also show the possibilities of adaptation.

In FIG. 1 shows in dotted lines the movement 1a of support frame 1 in the longitudinal direction to the track to avoid a fish plate 53 (also shown by dotted lines) which is preventing the hook of the gripping member 24 from gripping the rail head 9. This movement can be obtained by the action in parallel of the two jacks 7 and 8, but parallel action is not necessary if there is no obstacle on the opposite line of rails 10. In this latter case it is possible to operate either a single jack on the side where the obstacle to be avoided is encountered or to operate the two differentially in the case, for example, where the other side has an obstacle extending in the opposite direction to the first. The set of arrows in FIG. 1 shows the movement in parallel. The arrows in the plan view of FIG. 3 show the differential movement causing a rotation of the support frame about the articulation of the fork 15 of the guidance member 14.

In FIG. 2 the track is shown just in front of points when the two lines of rails 54 and 55 of a second track are approaching the rails 9 and 10 of the first. The combination of the movements of the various members of the device, particularly that of the lateral movements of the intermediate chassis 22 on the support frame 1 with the vertical movements of the gripping member 24 on said chassis, permits the introduction of the hook of the gripping member between the two rails 9 and 55 as long as the hook can pass between the heads of the two rails. Thus by the normal play of the gripping members it is possible to lift the two lines of rails 9 and 10 up to the immediate vicinity of the points. The advantage of this combination is shown in FIGS. 4 and 5 which show that when the hook can no longer pass between the heads of the two rails 9 and 55 (FIG. 4) for gripping the head of the line of rails 55 it is then simple to cross over said rail 55 by means of a displacement to the right of the intermediate chassis 22 relative to the support frame 1 combined with a vertical movement of the gripping member 24 relative to the chassis. On traversing said points 56 (FIG. 5) the combination of these movements also permits by the clearance of the already [discribed] *described* device with spacer blocks (FIG. 7) to sufficiently lower the gripping member so that without lateral gripping it can grip the tie plate of points 56.

It should be noted that throughout these adaptations illustrated by FIGS. 2, 4 and 5 traversing points requires no change of rails for guidance of the device by the support rollers 12 and 13 and no change in the position of the gripping member 25 on the line of rail 10.

These adaptations are not moreover limitative and, for example, on leaving points it is possible to follow the rail 55 in the second track with the gripping member 24 (FIG. 4) as long as this is permitted by the free sliding length of the chassis 22 of the support frame 1 whilst rail 55 moves away from rail 9. This variant permits a longer gripping of the combined two tracks than shown by FIG. 2, which involves regripping the line of rails 9 as soon as possible. Thus for example on traversing a fish plate it is possible to grip the tie plate of the rail between the sleepers with the gripping member. By this means the total displacement of the support frame 1 only takes place to the right thereof, as shown in FIG. 1 in dotted lines.

In fact all variants can be made thereto both as regards the adaptations to the various obstacles encountered and to the known manual or automatic control means for obtaining the movements described without departing from the scope of the invention.

What I claim as my invention is:

1. Apparatus for the vertical and lateral movement of a section of railway track wherein gripping members operated so as to be able to grip the two lines of rails are mounted on at least one support frame connected by articulated connecting members to a chassis movable on the track, which support frame is movable both vertically and laterally relative to said chassis under the action of lifting members or lining members, in order to move said track section and to bring it into a predetermined reference position, characterized in that said gripping members are provided for each side of the track and are *transversely* displaceable, substantially in a straight line[, transversely in relation to the support frame] *along said support frame*; and in that rail engaging means, for each side of the track, are mounted on the support frame and are operable to engage the track so as to face the gripping members for the same side of the track.

2. Apparatus as claimed in claim 1 in which said gripping members are also vertically displaceable in a straight line relative to said support frame.

3. Apparatus according to claim 1, characterized in that each gripping member of a line of rails is height-adjustably mounted on an intermediate chassis which is itself displaceably mounted on said support frame in a plane parallel to the plane of the track and transversely thereto.

4. Apparatus according to claim 3, characterized in that the control of the vertical displacement of a gripping member relative to its intermediate chassis is obtained by a device comprising multiple spacer blocks interchangeable as desired by means of a pre-selection control member.

5. Apparatus according to claim 1, characterized in that the support frame extends at least over the entire width of the railway track and supports the gripping [and supporting] members *and the rail engaging means* of two lines of rails of said track.

6. Apparatus according to claim 5, characterized in that the articulated connecting members connecting the support frame to the chassis of the vehicle comprise control members for moving said support frame longitudinally to the track or rotating the same in a plane substantially parallel to the plane of said track.

7. Apparatus according to claim 6, characterized in that the articulated connecting members connecting the support frame to the chassis of the vehicle comprise at least one guidance member for preventing said support frame turning on itself about its longitudinal axis.

8. Apparatus according to claim 5, characterized in that [the vertical and lateral support members of] *said rail engaging means on* the support frame are mounted on at least one axle parallel to said support frame, said axle being displaceable along its axis by means of *control means including* at least one control member which is extensibly connected to the support frame so as to be supported against the side of the head of one or other line of rails.

9. Apparatus according to claim 8, characterized in that the control means for displacing [the axle of the vertical and lateral support members of the support frame produce] *said rail engaging means include means for producing* a force which is [at least] equal to half that of the lining members which move said support frame.

10. Apparatus according to claim 8, characterized in that the axle upon which [are] *is* mounted [the vertical and lateral support members of the support frame] *said rail engaging means* is height-adjustably mounted on and relative to said support frame.

11. Apparatus for the vertical and lateral movement of a section of railway track wherein gripping members operated so as to be able to grip the two lines of rails are mounted on at least one support frame connected by articulated connecting members to a chassis movable on the track, which support frame is movable both vertically and laterally relative to said chassis under the action of lifting members or lining members, in order to move said track section and to bring it into a predetermined reference position, characterized in that said gripping members are provided for each side of the track and are *transversely* displaceable, in a straight line, [both vertically and transversely] *along the support frame and vertically displaceable* in relation to the support frame; and [in that] *rail engaging means comprising* single flange wheels, for each side of the track, are mounted on the support frame and rest, in operative position, vertically and horizontally on the rails, the single flanges of the said flanged wheels being located so as to face the gripping members for the same side of the track.

* * * * *